(12) United States Patent
Dry et al.

(10) Patent No.: US 10,919,474 B2
(45) Date of Patent: Feb. 16, 2021

(54) SAFETY DEVICE ACTUATION

(71) Applicant: Ford Global Technologies, LLC, Dearborn, MI (US)

(72) Inventors: Alan George Dry, Grosse Pointe Woods, MI (US); Mark A. Cuddihy, New Boston, MI (US); Derek Board, Ferndale, MI (US); Jimmy Moua, Canton, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 16/381,797

(22) Filed: Apr. 11, 2019

(65) Prior Publication Data

US 2020/0324721 A1 Oct. 15, 2020

(51) Int. Cl.
| | | |
|---|---|---|
| *B60R 21/013* | (2006.01) | |
| *B60N 2/42* | (2006.01) | |
| *B60Q 1/00* | (2006.01) | |
| *B60R 21/01* | (2006.01) | |
| *B60N 2/005* | (2006.01) | |
| *B60R 21/207* | (2006.01) | |

(52) U.S. Cl.
CPC ............ *B60R 21/013* (2013.01); *B60N 2/005* (2013.01); *B60R 21/207* (2013.01); *B60R 2021/01286* (2013.01)

(58) Field of Classification Search
CPC ....... B60R 21/013; B60R 21/01; B60R 21/00; B60R 21/16; B60N 2/002; B60N 2/42; B60N 2/02; G06F 13/28; B64D 11/06; B60Q 1/00
See application file for complete search history.

(56) References Cited

U.S. PATENT DOCUMENTS

| | | | | |
|---|---|---|---|---|
| 5,696,409 A | * | 12/1997 | Handman | ............ B60N 2/0224 307/10.1 |
| 6,240,352 B1 | * | 5/2001 | McCurdy | ............... B60N 2/002 280/735 |
| 6,400,259 B1 | * | 6/2002 | Bourcart | ............... B60N 2/002 340/425.5 |
| 7,232,094 B2 | * | 6/2007 | Bishop | ............... B60N 2/01575 244/118.6 |
| 2005/0150705 A1 | * | 7/2005 | Vincent | .................... B60N 2/06 180/271 |

(Continued)

FOREIGN PATENT DOCUMENTS

| | | | | |
|---|---|---|---|---|
| DE | 102004018207 A1 | | 11/2005 | |
| DE | 102008047804 A1 | * | 4/2009 | ............. B60N 2/002 |
| EP | 1092597 A1 | * | 4/2001 | ............. B60R 21/01 |

(Continued)

*Primary Examiner* — Yuri Kan
(74) *Attorney, Agent, or Firm* — Frank A. MacKenzie; Bejin Bieneman PLC

(57) ABSTRACT

A system includes a rail including a capacitive transmitter, a computer programmed to send an actuation identifier code along the capacitive transmitter, and a plurality of seats supported by the rail, each seat including a seat controller communicatively connected to the capacitive transmitter. Each seat controller is programmed to actuate a safety device when a device identifier code corresponding to the safety device matches the actuation identifier code.

20 Claims, 5 Drawing Sheets

(56) References Cited

U.S. PATENT DOCUMENTS

2005/0258676 A1* 11/2005 Mitchell ............ B64D 11/0624
297/216.13
2006/0248304 A1* 11/2006 Hosouchi .............. G06F 3/0605
711/165

FOREIGN PATENT DOCUMENTS

FR           2879528 A1     6/2006
FR           2868741 A1     2/2008

* cited by examiner

SAFETY DEVICE ACTUATION

BACKGROUND

Vehicles may include floor rail systems. The floor rail systems may include a plurality of rails. The rails may support one or more seats in the vehicle. The rails may transmit electricity to the seats. For example, the rails may provide electricity from a vehicle battery to a seat motor to move the seat along the rails.

The seat may include a plurality of safety devices, e.g., restraints, airbags, pretensioners, etc. These safety devices typically require wires for connection to a vehicle computer and for power to actuation. However, the wires may interfere with the floor rail system. There remains an opportunity to design a system for actuating seat safety devices for seats supported by a floor rail system.

DETAILED DESCRIPTION

Figure 1:
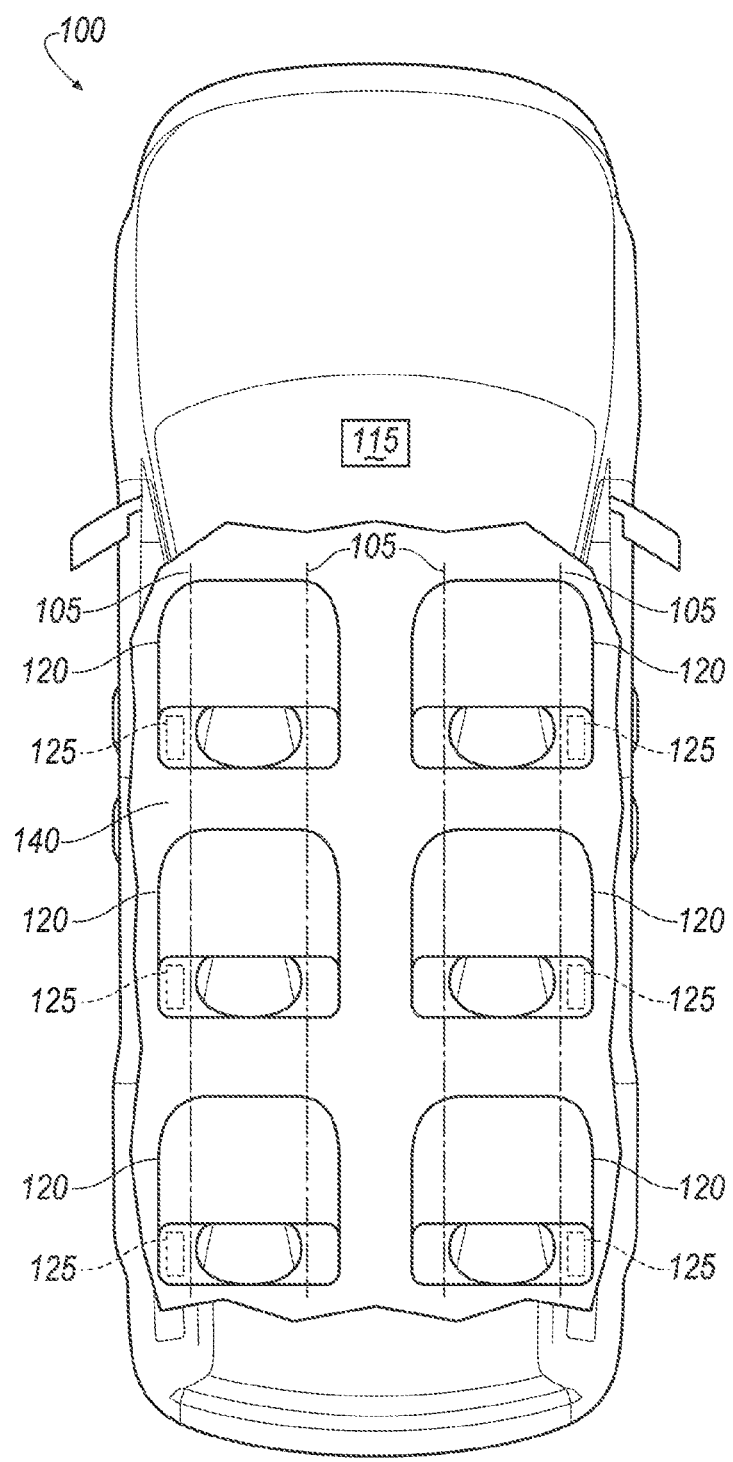
FIG. 1 is a plan view of a vehicle with seats supported by rails.

A system includes a rail including a capacitive transmitter, a computer programmed to send an actuation identifier code along the capacitive transmitter, and a plurality of seats supported by the rail, each seat including a seat controller communicatively connected to the capacitive transmitter. Each seat controller is programmed to actuate a safety device when a device identifier code corresponding to the safety device matches the actuation identifier code.

The safety device may be one of an airbag inflator, a seat belt pretensioner, or an occupant antisubmarining device.

The computer may be further programmed to identify a respective safety device in each of the plurality of seats and to send a plurality of actuation identifier codes matching device identifier codes corresponding to the respective safety devices.

The computer may be further programmed to detect a vehicle impact and to identify an airbag in one of the seats based on the vehicle impact.

The computer may be further programmed to send the actuation identifier code corresponding to an airbag inflator connected to the identified airbag.

The computer may be further programmed to convert an actuator pulse into the actuation identifier code.

Each seat controller may be further programmed to convert the actuation identifier code to an actuator pulse.

Each seat controller may be further programmed to actuate a respective safety device based on the actuator pulse.

Each seat may include at least one safety device, and each safety device may have a different respective device identifier code.

The system may further include a plurality of carriages slideably supported on the rail, and each seat may be supported by at least one of the carriages.

Each carriage may be designed to transmit the actuation identifier code to the seat controller.

The seat controller may be further programmed to receive a second actuation identifier code, to identify a second safety device having a device identifier code matching the second actuation identifier code, and to actuate the safety device and the second safety device.

Each seat may include a capacitive receiver communicatively connected to the seat controller and to the capacitive transmitter.

A method includes sending an actuation identifier code along a capacitive transmitter mounted to a rail, receiving the actuation identifier code in a plurality of seats supported by the rail from the capacitive transmitter, identifying a safety device in one of the plurality of seats having a device identifier code matching the actuation identifier code, and actuating the safety device.

The method may further include identifying a respective safety device in each of the plurality of seats and sending a plurality of actuation identifier codes matching device identifier codes corresponding to the respective safety devices.

The method may further include detecting a vehicle impact and identifying an airbag in one of the seats based on the vehicle impact.

The method may further include converting an actuator pulse into the actuation identifier code.

The method may further include sending a second actuation identifier code matching a device identifier code of a second safety device in a same seat as the safety device and actuating the safety device and the second safety device.

With reference to the Figures, wherein like numerals indicate like parts throughout the several views, a vehicle 100 includes a rail 105 including a capacitive transmitter 110, a computer 115 programmed to send an actuation identifier code along the capacitive transmitter 110, and a plurality of seats 120 supported by the rail 105, each seat 120 including a seat controller 125 communicatively connected to the capacitive transmitter 110. Each seat controller 125 is programmed to actuate a safety device 130 when a device identifier code corresponding to the safety device 130 matches the actuation identifier code.

Using the capacitive transmitter 110 to send an encoded signal to the plurality of seats 120 eliminates cross linking and directs actuation of safety devices 130 to each specific seat 120 substantially simultaneously. The capacitive transmitters 110 and receivers slide over each other, which reduces space use in the vehicle 100. The capacitive transmitter 110 may be constructed as a ribbon with a plurality of capacitive cells, e.g., by three-dimensional printing, easing manufacturing constraints.

FIG. 1 is a plan view of a vehicle 100. The vehicle 100 includes the vehicle computer 115. The vehicle computer 115 includes a processor and a memory. The memory stores instructions executable by the processor. The memory may be of any type, e.g., hard disk drives, solid state drives, servers, or any volatile or non-volatile media. The vehicle computer 115 may include programming to actuate one or more safety devices 130, e.g., in a restraint control module.

The vehicle computer 115 includes a pulse encoder 135. The pulse encoder 135 may be programmed to encode an actuator pulse into an actuation identifier code. For example, the pulse encoder 135 may encode the actuator pulse to a Communications Area Network (CAN) signal transmittable over the capacitive transmitter 110. Alternatively, the pulse encoder 135 may be a separate device (e.g., an electronic control unit (ECU), etc.) programmed to encode the actuator pulse into the actuation identifier code. As described below, the actuation identifier code corresponds to a device identifier code of a specific safety device 130.

The vehicle 100 includes at least one rail 105 installed in a floor 140. Specifically, the rail 105 is fixed relative to the floor 140, i.e., does not move relative to the floor 140. The vehicle 100 may include a plurality of rails 105, as shown in FIG. 1. The rails 105 support a plurality of seats 120, as described below. For example, as shown in FIG. 1, the vehicle 100 may include four rails 105 supporting six seats 120. The rails 105 may supply electricity to the seats 120, e.g., from a vehicle battery, from the computer 115, etc.

Figure 3:
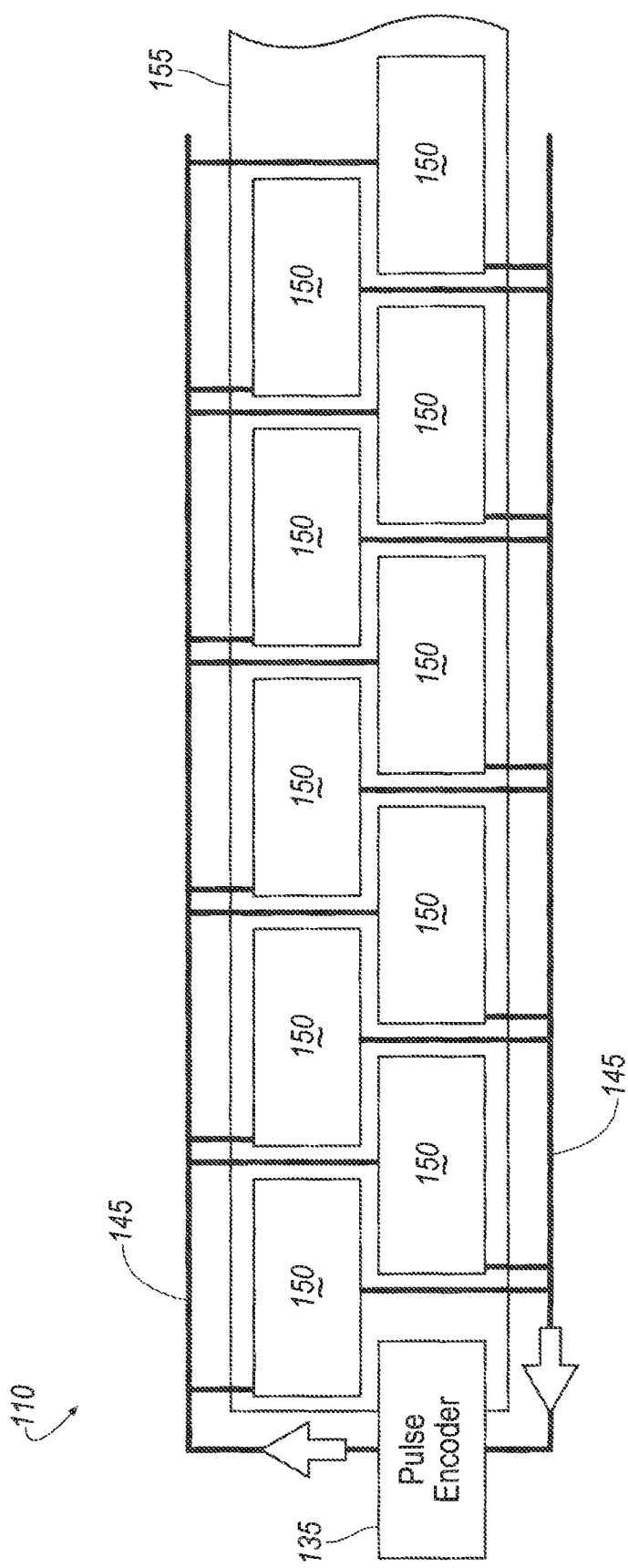
FIG. 3 is a side view of a capacitive transmitter.

At least one of the rails 105 includes the capacitive transmitter 110. The capacitive transmitter 110 transmits messages from the computer 115. As shown in FIG. 3, the capacitive transmitter 110 may include a conductor 145 and a plurality of cells 150 affixed to a ribbon 155. The conductor 145 may be, e.g., a wire extending from the vehicle computer 115 along the rail 105. Each cell 150 may be communicatively connected to each other cell 150 by the conductor 145. The conductor 145 may energize the cells 150 substantially simultaneously to transmit the encoded signal to the seats 120. The cells 150 may be arranged in a staggered pattern, as shown in FIG. 3, to provide substantially complete coverage of the ribbon 155. Alternatively, the cells 150 may be arranged in any suitable pattern, e.g., a hexagonal tiling, a triangular tiling, etc. The cells 150 and the ribbon 155 may be manufactured in an additive process, e.g., three-dimensional printing.

Figure 2:
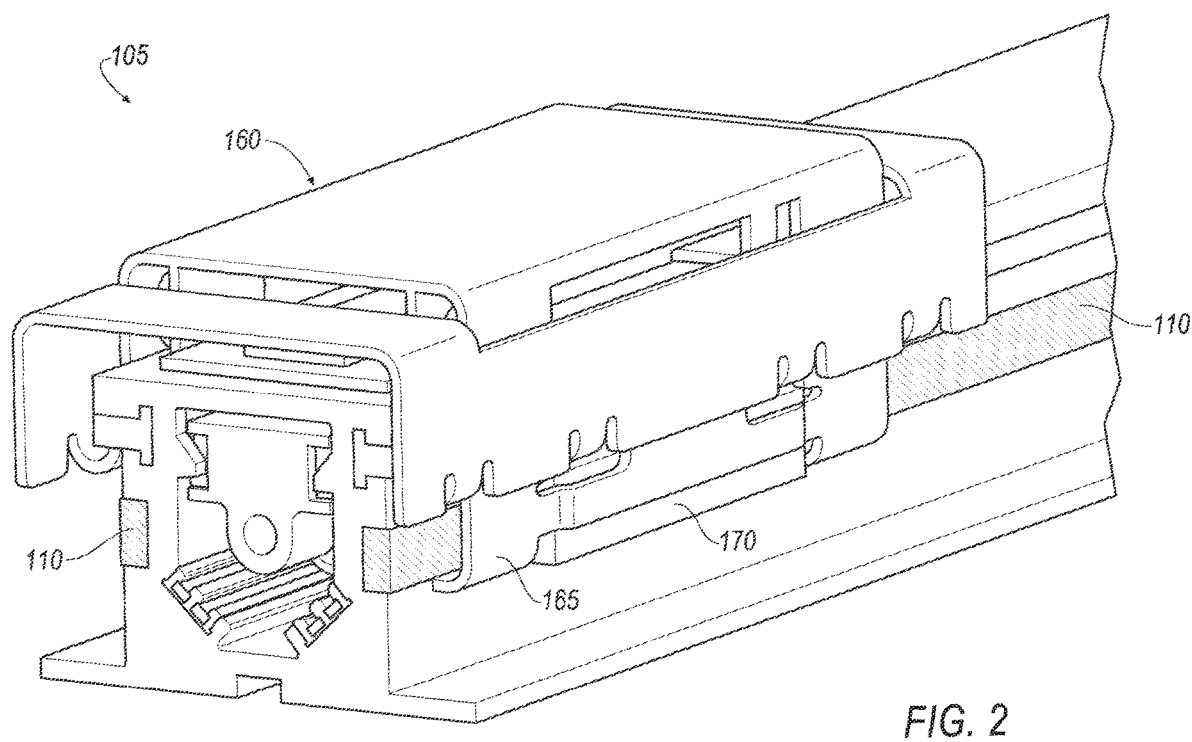
FIG. 2 is a perspective view of a carriage on one of the rails.

A plurality of carriages 160, one of which is shown in FIG. 2, are supported by the rail 105. The carriages 160 are slideably supported by the rail 105. The carriages 160 are movable relative to the rail 105 with a suitable movement device, e.g., bearings, wheels, etc. The vehicle 100 may include one or more movement mechanisms to move the carriages 160 along the rails 105, e.g., a motor.

The carriages 160 are communicatively connected to the capacitive transmitter 110. As shown in FIG. 2, the carriage 160 may include a capacitive bridge 165. The capacitive transmitter 110 induces a capacitance in the capacitive bridge 165. The capacitive bridge 165 transmits the capacitance to the seat controller 125, which the seat controller 125 may read as the actuation identification code. In other words, the carriages 160 communicate with the capacitive transmitter 110 wirelessly, e.g., capacitively across an air gap between the carriage 160 and the capacitive transmitter 110. The computer 115 may communicate commands to the seat controller 125 with the capacitive bridge 165. For example, the vehicle computer 115 may request a status and/or health of one or more safety devices 130 from the seat controller 125 to determine whether the safety devices 130 are available to actuate during the impact. The computer 115 may communicate occupant preferences (e.g., seat position, seat heater level, entertainment system settings, etc.) to each seat controller 125.

Figure 4:
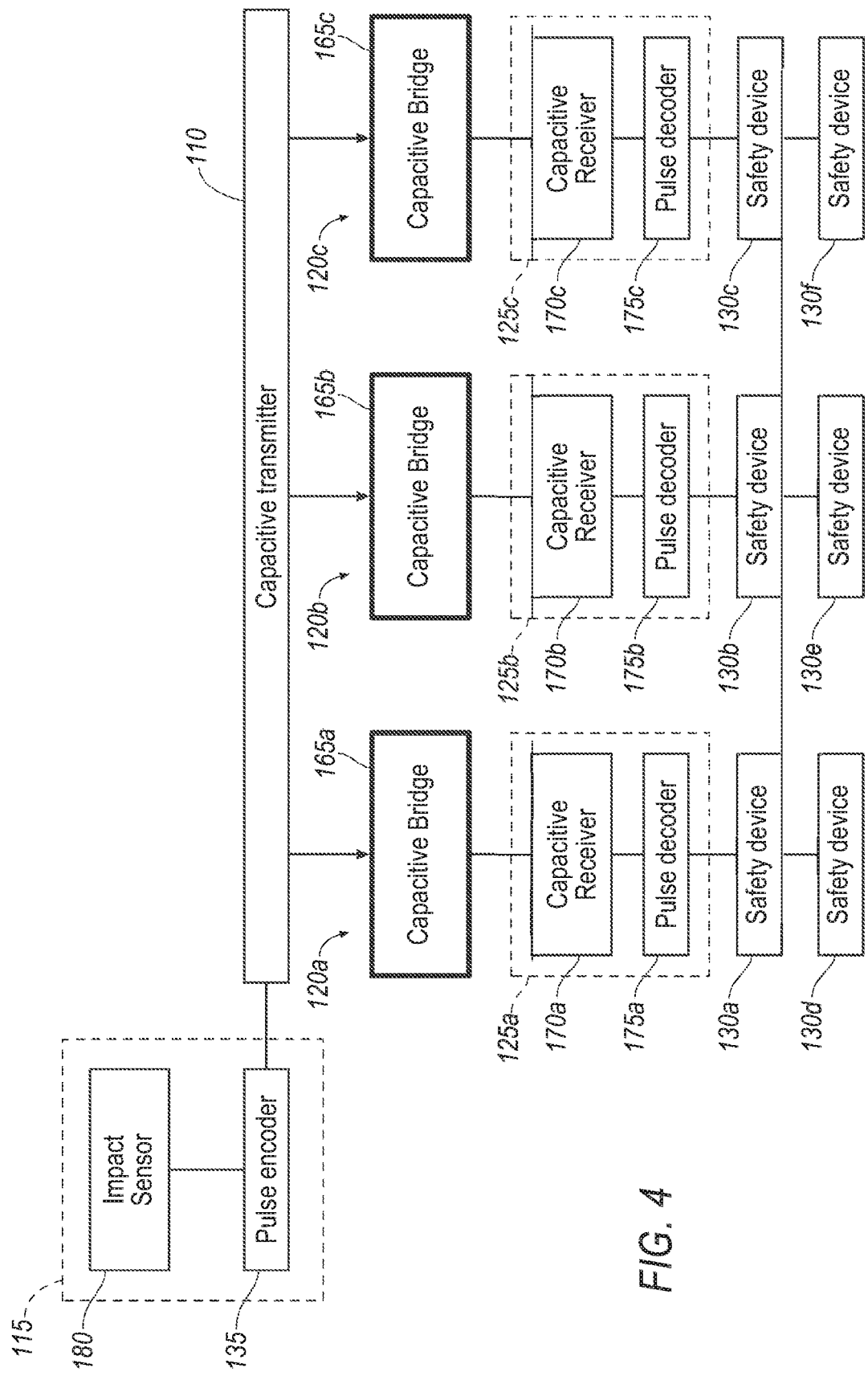
FIG. 4 is a block diagram of a system for actuating safety devices in the seats.

The vehicle 100 includes a plurality of seats 120, as shown in FIGS. 1, 4. Each seat 120 may support a vehicle occupant. Each seat 120 is supported by at least one carriage 160. The seat 120 and the carriage(s) 160 to which the seat 120 is mounted move together as a unit relative to the rail 105. In other words, as the carriages 160 move along the rail 105, the seats 120 move along the rail 105. FIG. 4 shows three seats 120a, 120b, 120c in communication with the computer 115.

Each seat 120a, 120b, 120c includes a respective seat controller 125a, 125b, 125c (collectively, seat controllers 125) and at least one safety device 130a-130f (collectively, safety devices 130), as shown in FIG. 4. The seat controller 125 includes a processor and a memory. The seat controller 125 provides instructions to actuate one or more safety devices 130 installed in the seat 120. The memory of the seat controller 125 includes device identifier codes for each safety device 130.

The safety device 130 may be of any suitable type that restrains and/or controls the kinematics of an occupant in the seat 120. The safety device 130 is supported on the seat 120 and moves with the seat 120 as a unit relative to the rail 105. The seat controller 125 is programmed to actuate the safety device 130 upon receiving the actuator identifier code matching the device identifier code corresponding to the safety device 130.

As one example, at least one of the safety devices 130 may be an airbag module. The airbag module includes an airbag and an inflator. During the impact, the airbag inflates and controls the kinematics of the occupant. The seat controller 125 may be programmed to actuate the inflator upon receiving the actuation identifier code matching the device identifier code corresponding to the airbag module. The airbag may be any suitable shape, e.g., substantially spherical, substantially rectangular and/or curtain-shaped, substantially tubular, etc.

As another example, at least one of the safety devices 130 may be a seat belt pretensioner. The seat belt pretensioner locks a webbing of a seat belt during the impact, preventing further payout of the webbing and securing the occupant to the seat 120. The seat controller 125 may be programmed to actuate the seat belt pretensioners upon receiving the actuation identifier code matching the device identifier code of the seat belt pretensioner.

As another example, at least one of the safety devices 130 may be an antisubmarining device. The antisubmarining device prevents the occupant from sliding down along the seat during the impact. The antisumbarining device may include, e.g., a bar that raises a front end of a seat cushion during the impact. The raised front end may reduce or prevent the occupant from sliding along the seat cushion and sliding down below a lap strap of the seat belt. The seat controller 125 may be programmed to actuate the antisubmarining device upon receiving the actuation identifier code matching the device identifier code of the antisubmarining device.

Each seat 120 includes a capacitive receiver 170, as shown in FIGS. 2, 4. The capacitive receiver 170 is communicatively connected to the capacitive transmitter 110. That is, the capacitive receiver 170 is actuated by the electric signal transmitted through the capacitive transmitter 110, such that charges sent through the capacitive transmitter 110 induce charges in the capacitive receiver 170, thus transmitting the actuation identifier code from the capacitive transmitter 110 to the capacitive receiver 170. As shown in FIG. 4, each seat 120a, 120b, 120c includes a respective capacitive receiver 170a, 170b, 170c.

Each seat 120a, 120b, 120c includes a respective pulse decoder 175a, 175b, 175c (collectively, pulse decoders 175). The pulse decoders 175 convert the actuation identifier code to an actuation pulse that the seat controllers 125 may use to actuate the safety devices 130. For example, the pulse decoders 175 convert the actuation identifier code, i.e., the pulse capacitively transmitted from the capacitive transmitter 110 to the carriage 10, into a standard restraint control module energy pulse, i.e., an actuation pulse. The actuation pulse actuates the safety device 130. For example, the actuation pulse may actuate the inflator to inflate the airbag. In another example, the actuation pulse may actuate the pretensioner to provide tension to the seat belt.

The vehicle 100 may include an impact sensor 180. The impact sensor 180 may communicate with the computer 115.

The impact sensor 180 collects data and, when the data exceed a predetermined threshold, the impact sensor 180 communicates to the computer 115 that a vehicle impact is occurring. For example, the impact sensor 180 may be an accelerometer, and the predetermined threshold may be an acceleration threshold determined based on empirical testing of example vehicles in collision tests. The impact sensor 180 may determine a direction of the impact, e.g., a forward impact, a rear impact, a side impact, a rear impact, etc.

Upon identifying the impact, the computer 115 identifies one or more safety devices 130 to actuate. To absorb energy from occupants during the impact, the computer 115 identifies one or more safety devices 130 of seats 120 in which the occupants are seated. For example, the computer 115 may identify a seat airbag in the seat 120 in which one of the occupants is seated. In addition to the safety devices 130 in the seats 120, the computer 115 may identify and actuate one or more vehicle safety devices (not shown) separate from the seats 120, e.g., a side curtain airbag, a steering wheel airbag, an instrument panel airbag, a knee bolster, etc.

The computer 115 sends the actuation identifier code to the seats 120. In this context, an "actuation identifier code" is a string of data corresponding to the device identifier code of a specific safety device 130. The actuation identifier code and the device identifier code can be, e.g., a string of alphanumeric bits, a string of binary digits, a string of hexadecimal digits, etc. The computer 115 may instruct the pulse encoder 135 to encode the actuation identifier code to a signal transmitted over the capacitive transmitter 110, e.g., a CAN signal.

The computer 115 may send a plurality of actuation identifier codes. During the impact, the computer 115 may determine to actuate a plurality of safety devices 130, e.g., for a plurality of seats 120. The computer 115 may identify a plurality of safety devices 130 and send actuation identifier codes matching device identifier codes of the identified safety devices 130. The computer 115 may identify the safety devices 130 based on, e.g., an occupancy of the seat 120, an orientation of the seat 120, a position of the seat 120 relative to the impact, etc. For example, if the seat 120 is facing in a vehicle forward direction, the computer 115 may identify the seatbelt pretensioner and the airbag, and if another seat 120 is facing in a vehicle rearward direction, the computer 115 may identify only the seatbelt pretensioner. Each seat controller 125 may receive the actuation identifier codes, convert the actuation identifier codes to actuation pulses, and actuate the safety devices 130 having device identifier codes matching the actuation identifier codes. For example, as shown in FIG. 4, the computer 115 may identify safety devices 130a and 130d (e.g., an airbag module and a seat belt pretensioner) in the seat 120a and the safety device 130b (e.g., a seat belt pretensioner) in the seat 120b while identifying neither safety device 130c, 130f in the seat 120c (e.g., because the seat 130c is unoccupied). The computer 115 sends actuation identifier codes corresponding to the device identifier codes of the safety devices 130a, 130b, 130d over the capacitive transmitter 110. Each seat controller 125a, 125b, and 12c receives the actuation identifier codes from the capacitive transmitter 110. Then, the seat controller 125a actuates the safety devices 130a, 130d, the seat controller 125b actuates the safety device 130b, and the seat controller 125c does not actuate the safety devices 130c, 130f.

Alternatively, the computer 115 may send actuation identifier codes for one or more safety devices 130 in all of the seats 120, and each seat controller 125 may be programmed to identify whether its seat 120 is occupied and to actuate the safety devices 130 upon determining that the seat 120 is occupied. The seat controller 125 may be programmed to actuate one or more of the safety devices 130 based on an orientation of the seat 120. That is, the computer 115 may determine the specific safety devices 130 for the seat controllers 125 in specific seats 120 to actuate during the impact, or the computer 115 may instruct all of the seat controllers 125 to actuate the safety devices 130, and the seat controllers 125 then determine to actuate the safety devices 130 upon determining whether the seats 120 are occupied and the orientation of the seats 120.

During operation of the vehicle 100, the computer 115 may actuate the capacitive transmitter 110 at specific time intervals, e.g., every 50 milliseconds, to communicate with the seats 120. When the impact sensor 180 does not detect an impact, the computer 115 does not send actuation identifier codes over the capacitive transmitter 110, and the seat controllers 125 do not actuate the safety devices. Upon detecting the impact, at the next time interval, the computer 115 may actuate the capacitive transmitter 110 to send the actuation identifier codes corresponding to the device identifier codes of the identified safety devices 130. By continually actuating the capacitive transmitter 110 at the time intervals, the computer 115 may rapidly instruct the seat controllers 125 to actuate the safety devices 130 during the impact, and the seat controllers 125 may instruct the safety devices 130 identified by the computer 115.

Figure 5:
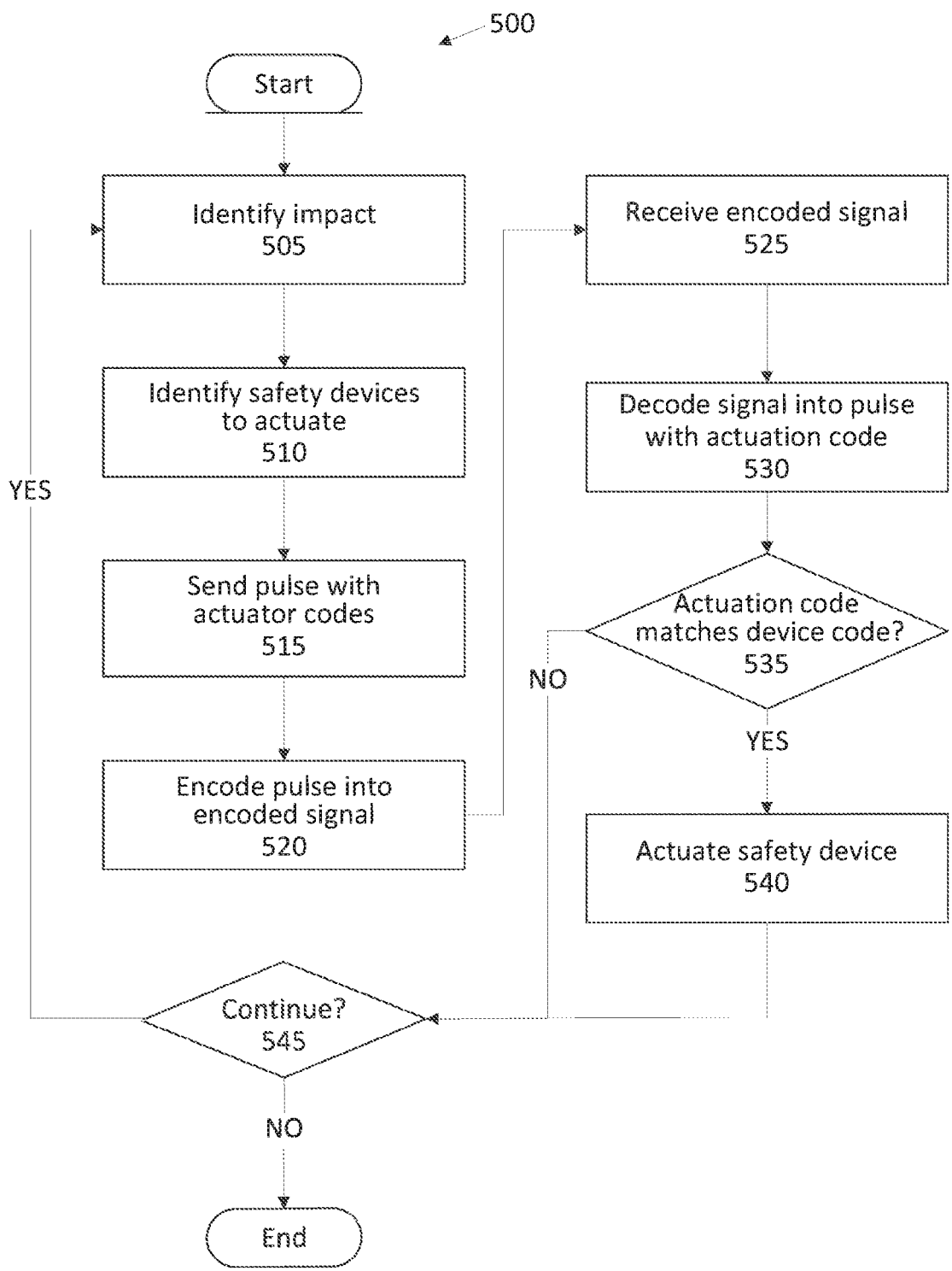
FIG. 5 is a block diagram of a process for actuating the safety devices.

FIG. 5 is a block diagram of a process 500 for actuating a safety device 130 in a vehicle seat 120. The process 500 begins in a block 505, in which a computer 115 identifies an impact. As described above, an impact sensor 180 may provide data indicating the impact to the computer 115. Based on the data, the computer 115 identifies the impact.

Next, in a block 510, the computer 115 identifies one or more safety devices 130 in one or more seats 120. The computer 115 identifies the safety devices 130 to actuate to absorb energy from vehicle occupants. For example, the computer 115 may identify respective airbag modules in one or more seats 120. The computer 115 may identify the safety devices 130 based on, e.g., the direction of the impact.

Next, in a block 515, the computer 115 transmits an actuator pulse to actuate the safety devices 130. The actuator pulse is an electric signal that actuates the safety devices 130 identified by the computer 115. The computer 115 generates the actuator pulse to actuate the identified safety devices 130.

Next, in a block 520, the computer 115 encodes the actuator pulse to an encoded signal with a pulse encoder 135. As described above, the pulse encoder 135 encodes the actuator pulse into data transmittable over the capacitive transmitter 110. The pulse encoder 135 encodes the actuator pulse with actuation identifier codes corresponding to the safety devices 130 that the computer 115 identified to actuate.

Next, in a block 525, a seat controller 125 of one of the seats 120 receives the encoded signal. As described above, the seat controller 125 may receive the encoded signal from the capacitive transmitter 110 via the carriage 160. The capacitive transmitter 110 incudes a capacitance in a capacitive bridge 165, and the seat controller 125 receives the encoded signal from the capacitance in the capacitive bridge 165.

Next, in a block 530, the seat controller 125 decodes the encoded signal into the actuator pulse and actuation identifier codes. The seat controller 125 includes a pulse decoder 175 that converts the encoded signal into the actuator pulse and the actuation identifier codes. With the actuator pulse and the actuation identifier codes, the seat controller 125 may actuate one or more safety devices 130.

Next, in a block 535, the seat controller 125 determines whether the actuation identifier codes match one or more device identifier codes of the safety devices 130 in the seat 120. As described above, the computer 115 includes actuation identifier codes corresponding to specific safety devices in specific seats. The seat controller 125 compares the actuation identifier codes from the decoded signal to the device identifier codes corresponding to the safety devices 130 installed in the seat 120 in which the seat controller 125 is installed. If at least one actuation identifier code matches one of the device identifier codes of the safety devices 130 of the seat 120, the process 500 continues in a block 540. Otherwise, the process 500 continues in a block 545.

In the block 540, the seat controller 125 actuates the safety devices 130 having device identifier codes matching the actuation identifier codes received from the computer 115. The seat controller 125 sends the actuator pulse to the safety devices 130 to actuate the safety devices 130. For example, the seat controller 125 may actuate an inflator of an airbag module identified by the computer 115 to inflate an airbag.

In the block 545, the computer 115 determines whether to continue the process 500. For example, the computer 115 may determine not to continue the process 500 when the impact sensor 180 no longer detects an impact. If the computer 115 determines to continue, the process 500 returns to the block 505. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 115 and seat controller 125, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 115 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a rail including a capacitive transmitter;
a computer programmed to send an actuation identifier code along the capacitive transmitter; and
a plurality of seats, each seat supported by one or more respective carriages on the rail, each carriage including a capacitive bridge, each seat including a seat controller communicatively connected to the capacitive transmitter via the capacitive bridge;
wherein each seat controller is programmed to, upon receiving the actuation identifier code via the capacitive bridge, actuate a safety device when a device identifier code corresponding to the safety device matches the actuation identifier code;

wherein the capacitive transmitter is configured to induce a capacitance in the capacitive bridge to transmit the actuation identifier code to each seat controller.

2. The system of claim 1, wherein the safety device is one of an airbag inflator, a seat belt pretensioner, or an occupant antisubmarining device.

3. The system of claim 1, wherein the computer is further programmed to identify a respective safety device in each of the plurality of seats and to send a plurality of actuation identifier codes matching device identifier codes corresponding to the respective safety devices.

4. The system of claim 1, wherein the computer is further programmed to detect a vehicle impact based on data received from an impact sensor and to identify an airbag in one of the seats based on the vehicle impact.

5. The system of claim 4, wherein the computer is further programmed to actuate the capacitive transmitter to send the actuation identifier code to the seat controller via the capacitive bridge, the actuation identifier code corresponding to an airbag inflator connected to the identified airbag, and the seat controller is further programmed to, upon receiving the actuation identifier code via the capacitive bridge in response to the vehicle impact, actuate the airbag inflator.

6. The system of claim 1, wherein the computer is further programmed to convert an actuator pulse into the actuation identifier code.

7. The system of claim 1, wherein each seat controller is further programmed to convert the actuation identifier code to an actuator pulse.

8. The system of claim 7, wherein each seat controller is further programmed to actuate a respective safety device based on the actuator pulse.

9. The system of claim 1, wherein each seat includes at least one safety device, and each safety device has a different respective device identifier code.

10. The system of claim 1, wherein the seat controller is further programmed to receive a second actuation identifier code, to identify a second safety device having a device identifier code matching the second actuation identifier code, and to actuate the safety device and the second safety device.

11. The system of claim 1, wherein each seat includes a capacitive receiver communicatively connected to the seat controller and to the capacitive transmitter.

12. A method, comprising:
identifying a vehicle impact based on data from an impact sensor;
upon identifying the vehicle impact, actuating a capacitive transmitter along a rail to induce a capacitance in a respective capacitive bridge of each of a plurality of seats supported by the rail to send an actuation identifier code;
receiving the actuation identifier code based on the induced capacitance of the respective capacitive bridge in each of the plurality of seats from the capacitive transmitter;
identifying a safety device in one of the plurality of seats having a device identifier code matching the actuation identifier code; and
actuating the safety device.

13. The method of claim 12, wherein the safety device is one of an airbag inflator, a seat belt pretensioner, or an occupant antisubmarining device.

14. The method of claim 12, further comprising identifying a respective safety device in each of the plurality of seats and sending a plurality of actuation identifier codes matching device identifier codes corresponding to the respective safety devices.

15. The method of claim 12, further comprising identifying an airbag in one of the seats based on the vehicle impact.

16. The method of claim 12, further comprising a plurality of carriages slideably supported on the rail, and each seat is supported by at least one of the carriages.

17. The method of claim 12, further comprising converting an actuator pulse into the actuation identifier code.

18. The method of claim 12, further comprising sending a second actuation identifier code matching a device identifier code of a second safety device in a same seat as the safety device and actuating the safety device and the second safety device.

19. A system, comprising:
a rail including a capacitive transmitter;
a vehicle seat including a safety device and a seat controller, the vehicle seat supported on the rail by a carriage including a capacitive bridge;
a computer programmed to:
identify an impact based on data from an impact sensor;
identify an actuation identifier code for the safety device in the vehicle seat based on the identified impact; and
actuate the capacitive transmitter to induce a capacitance in the capacitive bridge to transmit the actuation identifier code;
wherein the seat controller is programmed to:
detect a capacitance of the capacitive bridge;
identify the actuation identifier code based on the detected capacitance of the capacitive bridge;
based on the actuation identifier code, actuate the safety device in the vehicle seat.

20. The system of claim 19, wherein the computer is further programmed to identify the actuation identifier code based on an actuator pulse, and the seat controller is further programmed to convert the actuation identifier code to the actuator pulse.

* * * * *